United States Patent
Autenzeller et al.

(10) Patent No.: US 10,895,693 B2
(45) Date of Patent: Jan. 19, 2021

(54) DEVICE FOR TRANSMITTING OPTICAL SIGNALS BETWEEN TWO ROTATABLE SUB-ASSEMBLIES

(71) Applicant: LTN Servotechnik GmbH, Otterfing (DE)

(72) Inventors: Peter Autenzeller, Feldkirchen-Westerham (DE); Andreas Steinigans, Bad Aibling (DE)

(73) Assignee: LTN SERVOTECHNIK GMBH, Otterfing (DE)

( * ) Notice: Subject to any disclaimer, the term of this patent is extended or adjusted under 35 U.S.C. 154(b) by 0 days.

(21) Appl. No.: 16/409,465

(22) Filed: May 10, 2019

(65) Prior Publication Data
US 2019/0353849 A1    Nov. 21, 2019

(30) Foreign Application Priority Data

May 16, 2018    (EP) ..................................... 18172688

(51) Int. Cl.
*G02B 6/36* (2006.01)
*F16C 19/08* (2006.01)
*F16C 19/18* (2006.01)

(52) U.S. Cl.
CPC ............ *G02B 6/3604* (2013.01); *F16C 19/08* (2013.01); *F16C 19/18* (2013.01); *F16C 2370/20* (2013.01)

(58) Field of Classification Search
CPC ........ G02B 6/3604; F16C 19/08; F16C 19/18; F16C 2370/20

USPC .......................................................... 385/26
See application file for complete search history.

(56) References Cited

U.S. PATENT DOCUMENTS

| | | | | |
|---|---|---|---|---|
| 4,050,783 A | * | 9/1977 | Tardy | G02B 6/3803 385/64 |
| 4,815,812 A | * | 3/1989 | Miller | G02B 6/32 385/25 |
| 4,848,867 A | | 7/1989 | Kajioka et al. | |
| 4,872,737 A | | 10/1989 | Fukahori | |

(Continued)

FOREIGN PATENT DOCUMENTS

| EP | 0107035 A1 | 5/1984 |
|---|---|---|
| EP | 1857847 A1 | 11/2007 |
| WO | WO 2012/136645 A1 | 10/2012 |

*Primary Examiner* — Jerry M Blevins
(74) *Attorney, Agent, or Firm* — Carter Deluca & Farrell LLP

(57) ABSTRACT

In a device for transmitting optical signals between a first sub-assembly having a first lens, a first bearing ring, and a first clamping sleeve, which has a conical surface, and a second structural unit having a second lens, a second bearing ring, a second body, a second clamping sleeve, which has a conical surface, and a clamping device, the first bearing ring and the second bearing ring are associated with a bearing by which the first sub-assembly and the second sub-assembly are connected to each other rotatably about an axis. Arranged in a centered manner in relation to the axis are: the first lens on the first bearing ring with the aid of the first clamping sleeve through a first conical connection, the second lens on the second body with the aid of the second clamping sleeve through a second conical connection, and the second body on the second bearing ring with the aid of a clamping device by a third conical connection.

19 Claims, 3 Drawing Sheets

(56) References Cited

U.S. PATENT DOCUMENTS

| | | | |
|---|---|---|---|
| 6,950,568 B2 * | 9/2005 | Fernando | G01N 21/255 356/246 |
| 2009/0136175 A1 * | 5/2009 | Koitabashi | G02B 6/3604 385/18 |
| 2019/0195278 A1 * | 6/2019 | Elfert | F16C 19/522 |

* cited by examiner

DEVICE FOR TRANSMITTING OPTICAL SIGNALS BETWEEN TWO ROTATABLE SUB-ASSEMBLIES

CROSS-REFERENCE TO RELATED APPLICATIONS

The present application claims priority to application Ser. No. 18/172,688.6, filed in the European Patent Office on May 16, 2018, which is expressly incorporated herein in its entirety by reference thereto.

FIELD OF THE INVENTION

The present invention relates to a device for transmitting optical signals between two sub-assemblies that are rotatable relative to each other.

Corresponding sub-assemblies are often also referred to rotors and stators. In these sub-assemblies, optical signals are conducted in a contact-free manner via an air gap. Such devices are employed in numerous technical fields for the purpose of transmitting signals from a stationary to a rotating unit. In an effort to achieve high data-transmission rates, for instance for video signals of $4k$ quality, the structural units must be exactly positioned relative to each other in every rotary position.

BACKGROUND INFORMATION

European Published Patent Application No. 1 857 847 describes an optical rotary transmitter, in which, for calibration purposes, the deviation of the light beam from the axis of rotation is ascertained with the aid of two detectors. Based on the ascertained deviation, the tilting of the light beam is calculated and a corresponding compensation is implemented.

PCT Patent Application Publication No. WO 2012/136645 describes an optical rotary transmitter in which the surfaces of the rotor that define the position and orientation of the optical axis are machined such that a first axis has a misalignment in relation to the bearing axis while the optical axis coincides with the bearing axis. This is meant to make a calibration unnecessary while still reducing fault tolerances for the alignment of the optical axis relative to the axis of rotation of the rotor.

SUMMARY

Example embodiments of the present invention provide a device for transmitting optical signals, which allows for very high transmission rates yet is relatively simple in its production.

According to an example embodiment of the present invention, the device is used for transmitting optical signals between first and second sub-assemblies. The first sub-assembly includes a first lens, a first bearing ring, and a first clamping sleeve, which in turn has a conical surface. The second sub-assembly includes a second lens, a second bearing ring, a second body, a second clamping sleeve, which has a conical surface, and a clamping element. The first bearing ring and the second bearing ring are associated with a bearing by which the first structural unit and the second structural unit are connected to each other in a manner that allows a rotation about an axis. Using the first clamping sleeve, the first lens is indirectly or directly secured in position on the first bearing ring by a first conical connection, in a centered manner relative to the axis. In addition, using the second clamping sleeve, the second lens is indirectly or directly secured in position on the second body by a second conical connection, in a centered manner relative to the axis. With the aid of a clamping element, the second body is furthermore indirectly or directly secured in position on the second bearing ring by a third conical connection, in a centered manner relative to the axis.

The conical connections are produced by two conical surfaces in each case, which have the form of a right circular cone or a right circular truncated cone. Two conical surfaces are present within a connection, one conical surface of a connection in particular being arranged as a convex, outwardly curved outer surface (cone), and the other conical surface in particular being arranged as a concave, inwardly curved surface restricting a hollow space. The axis of symmetry of the first, second, and third conical connections or the conical surfaces or cones is the axis about which the first sub-assembly is rotatable relative to the second sub-assembly. More specifically, the first clamping sleeve and/or the second clamping sleeve each has/have an outwardly curved conical surface. The first clamping sleeve and/or the second clamping sleeve each has/have slots, and the conical surfaces of the first clamping sleeve and/or of the second clamping sleeve in particular are interrupted by slots, so that a radial flexibility or mobility of the particular clamping sleeve is provided. In the same manner, the second body may have slots in the region of the third conical connection or the conical surface of the second body, so that a radial flexibility or mobility is provided. The term 'conical surface' therefore also includes a surface that is interrupted (such as by slots).

The first lens or the second lens or both lenses is/are may be arranged as collimation lenses, in particular, as spherical lenses. Alternatively, it is also possible to use gradient lenses (GRIN lenses).

The first sub-assembly may have a sleeve, which is arranged radially between the first clamping sleeve and the first bearing ring in relation to the axis. The first conical connection is thereby produced by the first clamping sleeve and the sleeve, where the first conical surface of the first clamping sleeve and a conical surface of the sleeve are in physical contact. The sleeve may have an inwardly curved conical surface and may exert radial pressure on the first bearing ring.

The second body may directly have a first conical surface, and the second conical connection may be produced with the aid of this first conical surface of the second clamping sleeve. The first conical surface of the second body may be inwardly curved.

The second body may have a second conical surface, and the clamping element may have a conical surface, so that the third conical connection is produced with the aid of the second conical surface of the second body and the conical surface of the clamping element. The second conical surface of the second body may be outwardly curved and the conical surface of the clamping element may be inwardly curved.

The first conical surface of the second body may particularly be inwardly (concavely) curved and the second conical surface of the second body may be outwardly (convexly) curved.

The second body may have a thread, such as an external thread, and the clamping element may also have a thread, such as an internal thread. The thread of the second body engages with the thread of the clamping element, so that the third conical connection is produced or clamped by rotating the clamping element relative to the second body.

The first sub-assembly may include a first body, which has a thread, such as an internal thread. In addition, the first clamping sleeve may have a thread, such as an external thread. The thread of the first clamping sleeve engages with the thread of the first body, and the first conical connection is produced or clamped by rotating the first body relative to the first clamping sleeve.

The second sub-assembly may have a fastening element having a thread, such as an internal thread. In addition, the second clamping sleeve may have a thread, such as an external thread. The thread of the fastening element engages with the thread of the second clamping sleeve, and the second conical connection is produced or clamped by rotating the fastening element relative to the second clamping sleeve.

The first bearing ring or the second bearing ring, or both, may have a conical surface in each case.

The second bearing ring may have a second conical surface, in particular an inwardly curved conical surface, and the clamping element may have a conical surface, in particular an outwardly curved conical surface. The third conical connection may be produced with the aid of the second conical surface of the second bearing ring and the conical surface of the clamping element.

The clamping element may be arranged as a ring that includes two conical surfaces located on the inside.

The first bearing ring may have at least one conical surface (for example, two conical surfaces), in particular at least one inwardly curved conical surface. In this arrangement, the first conical connection is produced by the first clamping sleeve and the conical surface of the first bearing ring, the conical surface of the first clamping sleeve and a conical surface of the first bearing ring being in physical contact.

The bearing may be arranged as a rolling bearing. More specifically, the bearing may be arranged as two rolling bearings. For example, the two rolling bearings are pre-loaded and positioned by the first conical connection and the third conical connection, in the sense of a supported bearing system in an O-arrangement.

The device may be configured such that the first conical connection is produced under axial tensile loading of the first clamping sleeve. Alternatively or additionally, the second conical connection is produced under axial tensile loading of the second clamping sleeve.

The first sub-assembly may include a first optical waveguide and the second sub-assembly may include a second optical waveguide. The device may be configured so that the optical path of the light guided through the optical waveguides propagates with an axial directional component.

The use of the device described herein makes it possible to transmit signals of an improved quality so that extremely high data rates are achievable, in particular with minimal attenuation.

Further features and aspects of example embodiments of the present invention are described in more detail below with reference to the appended Figures.

DETAILED DESCRIPTION

Figure 1:
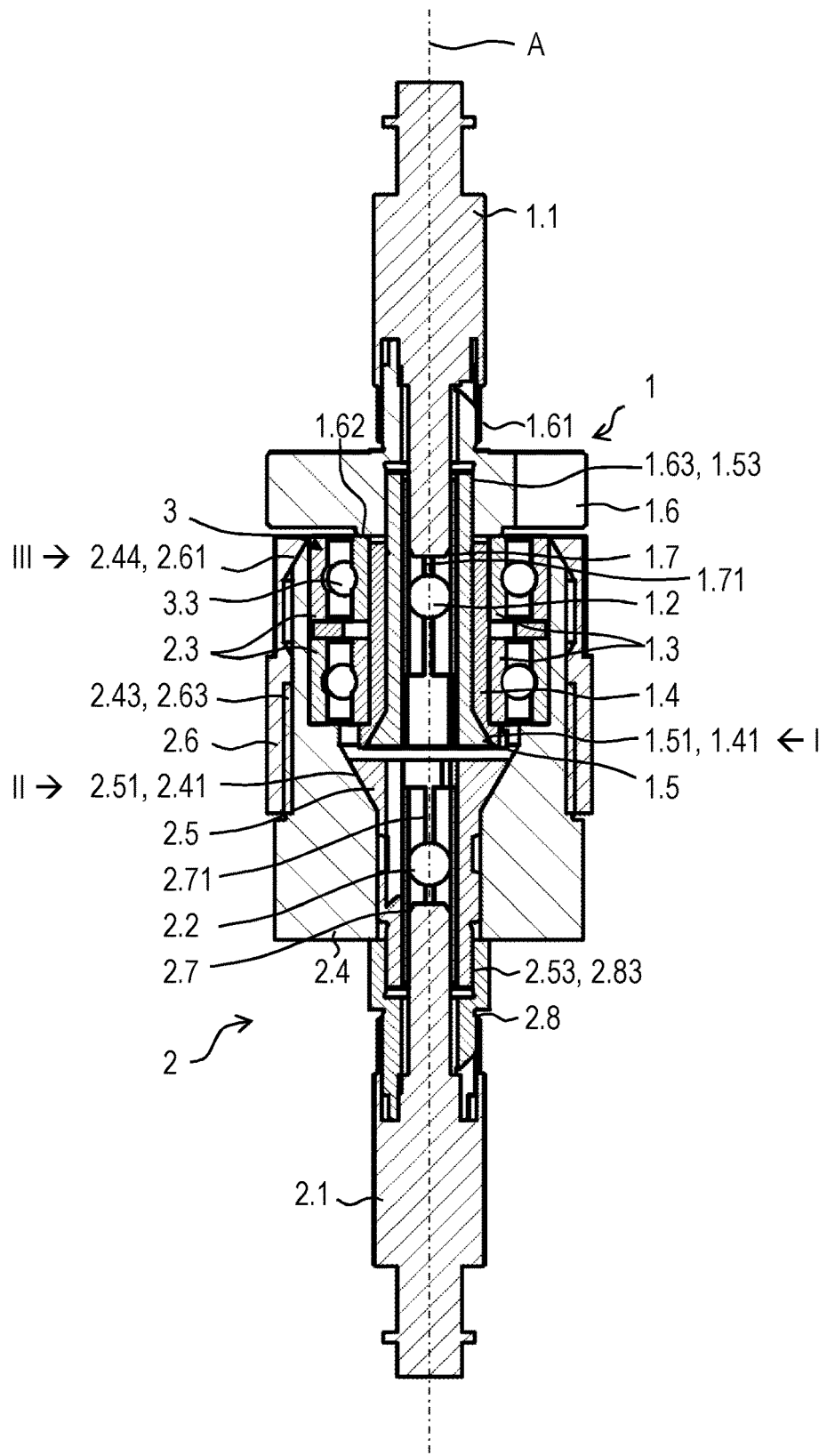
FIG. 1 is a longitudinal cross-sectional view of a device for transmitting optical signals according to an example embodiment of the present invention.

As illustrated in FIG. 1, a device according to an example embodiment of the present invention includes a first sub-assembly 1, e.g., a rotor, and a second sub-assembly 2, e.g., a stator. The device is used for transmitting optical signals at a high transmission rate between first sub-assembly 1 and second sub-assembly 2, first sub-assembly 1 and second sub-assembly 2 being rotatable relative to each other about an axis A. Second sub-assembly 1 is supported with the aid of a bearing 3 relative to first sub-assembly 1. Bearing 3 is arranged as two rolling bearings, each rolling bearing including a first bearing ring 1.3 (inner ring), a second bearing ring 2.3 (outer ring) as well as rolling elements 3.3, such as balls.

Figure 2:
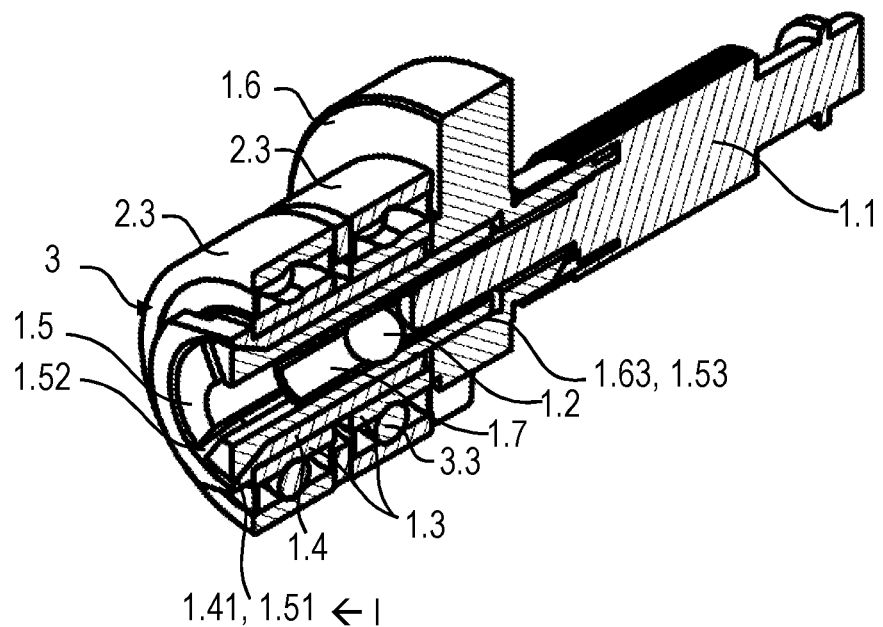
FIG. 2 is a perspective view of a first sub-assembly of the device with rolling bearings.

In the course of assembling first structural unit 1, a first clamping sleeve 1.5 is provided to begin with. First clamping sleeve 1.5 has a conical surface 1.51, a thread 1.53 as well as three slots 1.52 (see, FIG. 2). Slots 1.52 are provided at the particular end of first clamping sleeve 1.5 that is located axially opposite from thread 1.53, and slots 1.52, for example, extend through conical surface 1.51. Conical surface 1.51 of first clamping sleeve 1.5 is convex, i.e., curves outwardly. In other words, first clamping sleeve 1.5 includes a cone.

A sleeve 1.4, which also has a conical surface 1.41, is mounted radially outside in relation to first clamping sleeve 1.5, conical surface 1.41 being concave, i.e., inwardly curved. Two first bearing rings 1.3 of bearing 3 are slipped onto sleeve 1.4 or pressed onto it, so that slots 1.52 extend parallel to axis A.

Next, a first body 1.6 is provided, which has an external thread 1.61, a machined contact surface 1.62, and a further thread 1.63 (which is an internal thread in this example). The (non-conical) end section, i.e., thread 1.53, of first clamping sleeve 1.5 is screwed into further thread 1.63 of first body 1.6.

In addition, a first optical waveguide 1.1 and what is referred to as a first guide sleeve 1.7 as well as a first lens 1.2 are provided. First lens 1.2 is used for collimation purposes and is arranged as a transparent spherical body in the illustrated example embodiment, in particular, a quartz glass sphere. Guide sleeve 1.7 is produced from a ceramic material in this example and has a slot 1.71, which extends in the direction of axis A.

In a further assembly step, first lens 1.2 is introduced into first guide sleeve 1.7. Then, first guide sleeve 1.7 with first lens 1.2 is slipped onto the end of first optical waveguide 1.1. Guide sleeve 1.7 together with first lens 1.2 and first optical waveguide 1.1 is inserted through the bore of first body 1.6 and into first clamping sleeve 1.5. A union nut (not shown further in the figures) is screwed together with thread 1.61 so that first optical waveguide 1.1 is axially secured in position on first body 1.6, while an anti-twist protection of first optical waveguide 1.1 relative to first body 1.6 is established in addition through positive encoding.

When thread 1.53 of first clamping sleeve 1.5 is screwed into further thread 1.63 of first body 1.6, secure and exact clamping of first guide sleeve 1.7 together with first lens 1.2 in first structural unit 1 is achieved. Contact surface 1.62 is braced at first bearing ring 1.3, so that first clamping sleeve 1.5 is axially pulled into conical surface 1.41 of sleeve 1.4 during the further screw-fitting process, which induces radial clamping of first guide sleeve 1.7 together with first lens 1.2. Using first clamping sleeve 1.5, first lens 1.2 is thus secured in position on first bearing ring 1.3 with the aid of a first conical connection I, in a centered manner in relation to axis A and with contact between conical surface 1.51 of first clamping sleeve 1.5 and conical surface 1.41 of sleeve 1.4, which is located radially between first clamping sleeve 1.5 and first bearing ring 1.3. First lens 1.2 is clamped by first clamping sleeve 1.5 via first guide sleeve 1.7. As a result, the end of first optical waveguide 1.1 is also arranged in a centered manner in relation to axis A. In this arrangement, first conical connection I is produced under axial tensile loading of first clamping sleeve 1.5.

Figure 3:
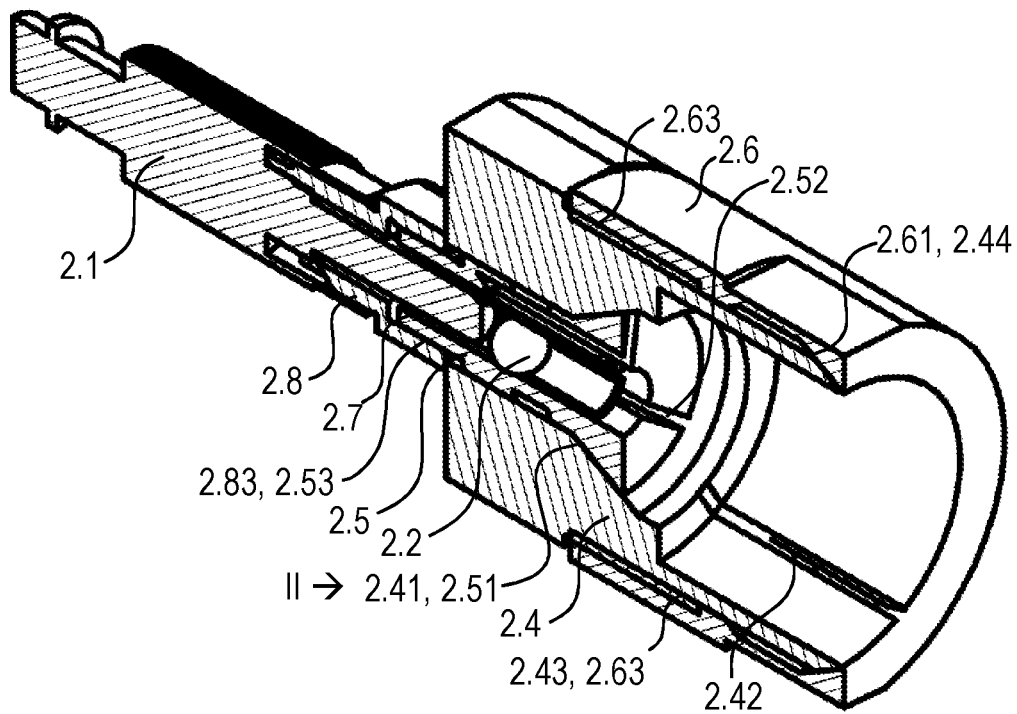
FIG. 3 is a perspective view of a second sub-assembly of the device.

Second sub-assembly 2, which is arranged as a stator in this example, includes, for example, a second clamping sleeve 2.5, which also has a conical surface 2.51 and slots 2.52 (see, FIG. 3). Conical surface 2.51 of second clamping sleeve 2.5 is convex, i.e., outwardly curved. In other words, second clamping sleeve 2.5 includes a cone. Radial resiliency of clamping sleeve 2.5 is achieved with the aid of slots 2.52 in the region of the cone or conical surface 2.51. In addition, a thread 2.53 is provided second clamping sleeve 2.5 at one end. Second clamping sleeve 2.5 is inserted into a bore of a second body 2.4 during the assembly of second structural unit 2, the bore in second body 2.4 having a first conical surface 2.41. This first conical surface 2.41 is concave, i.e., inwardly curved.

In addition, a second optical waveguide 2.1 and what is referred to as a second guide sleeve 2.7 as well as a second lens 2.2 are provided. Second lens 2.2 is used for collimation purposes and is also arranged as a transparent spherical body, in particular a quartz glass ball, in this example. Guide sleeve 2.7 is also made from a ceramic material and has a slot 2.71, which extends in the direction of axis A.

In a further assembly step, second lens 2.2 is introduced into second guide sleeve 2.7. Second guide sleeve 2.7 with second lens 2.2 is then slipped over the end of second optical waveguide 2.1.

In addition, a fastening device 2.8, including a thread 2.83, is provided, which is an internal thread in this example. Guide sleeve 2.7 together with second lens 2.2 and second optical waveguide 2.1 is inserted through a central bore of fastening device 2.8 into second clamping sleeve 2.5. Thread 2.83 of fastening device 2.8 is arranged to engage with thread 2.53 of second clamping sleeve 2.5, which axially projects from second body 2.4. Fastening device 2.8 is screwed onto thread 2.53 of second clamping sleeve 2.5 so that fastening device 2.8 is braced on second body 2.4 at the end face, and second optical waveguide 2.1 is secured in position with respect to second body 2.4, thereby additionally establishing an anti-twisting protection of second optical waveguide 2.1 in relation to second clamping sleeve 2.5 through positive connection.

Subsequently, second clamping sleeve 2.5 is pulled into first conical surface 2.41 of second body 2.4 in the further screw-fitting process, which produces radial clamping of second guide sleeve 2.7 together with second lens 2.2. After the assembly of the device has been concluded, first conical surface 2.41 of second body 2.4 is in physical contact with conical surface 2.51 of second clamping sleeve 2.5, thereby producing a second conical connection II. The second conical connection II secures second lens 2.2 in position on second body 2.4 in a centered manner with regard to axis A with the aid of second clamping sleeve 2.5. Second lens 2.2 is clamped by second clamping sleeve 2.5 via second guide sleeve 2.7. Second conical connection II is therefore produced under axial tensile loading of second clamping sleeve 2.5.

As illustrated in FIG. 3, second body 2.4 also includes a thread 2.43 (which is an external thread in this example) as well as a second conical surface 2.44, which is outwardly curved or convex. In addition, second body 2.4 has slots 2.42, which extend across a partial length of second body 2.4 in an axial direction and are open in the axial direction at one end of second body 2.4, so that second body 2.4 is also arranged to be radially resilient or radially elastic in this region.

A clamping device 2.6 is slipped onto second body 2.4. It has a concave, inwardly curved conical surface 2.61 as well as a thread 2.63 (which is an internal thread in this example). Thread 2.63 of clamping device 2.6 is screwed together with thread 2.43 of second body 2.4, and the resulting axial shifting of clamping element 2.6 relative to second body 2.4 causes second conical surface 2.44 of second body 2.4 to come into physical contact with conical surface 2.61 of clamping device 2.6. This causes second body 2.4 to deform in a radially inward direction in the region of slots 2.42. Clamping device 2.6 may also be referred to as a union nut.

First sub-assembly 1 may subsequently be connected to second sub-assembly 2. In this context, clamping device 2.6 is brought into a position in which second conical surface 2.44 of second body 2.4 and conical surface 2.61 of clamping device 2.6 are not in physical contact so that second body 2.4 is radially free of mechanical tension in the region of its slots 2.42. In this position, first sub-assembly 1 is introduced into second sub-assembly 2, and second bearing rings 2.3 (which are to be associated with second sub-assembly 2) are located radially opposite from second body 2.4 or its slots 2.42. Clamping device 2.6 is rotated, and because of threads 2.43, 2.63, which engage with each other, the second conical surface 2.44 of second body 2.4 comes into physical contact with conical surface 2.61 of clamping device 2.6, thereby producing a third conical connection III. Thereafter, second body 2.4 provided with slots 2.42 is pressed radially inward against second bearing rings 2.3 and clamped or braced as a result. Second body 2.4 is therefore secured in position on second bearing ring 2.3 in a centered manner in relation to axis A with the aid of clamping device 2.6 through third conical connection III. At the same time, the two rolling bearings are preloaded and positioned in the sense of a support bearing in an O-arrangement with the aid of first conical connection I and third conical connection III.

Figure 4:
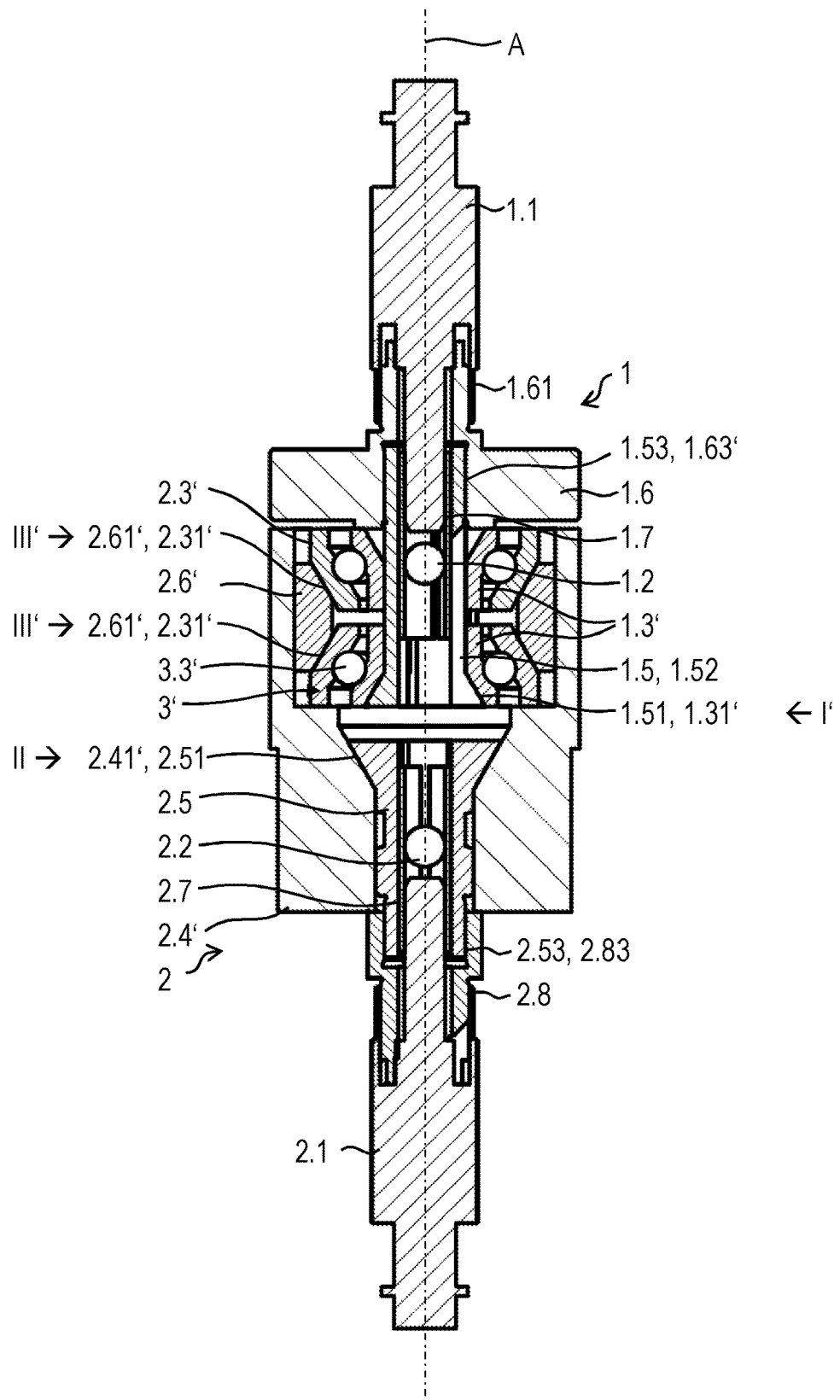
FIG. 4 is a longitudinal cross-sectional view of a device for transmitting optical signals according to an example embodiment of the present invention.

FIG. 4 is a longitudinal cross-sectional view through a device for transmitting optical signals according to a further example embodiment of the present invention. The device according to this example embodiment differs from the above-described example embodiment, in particular in that bearing 3' includes two first bearing rings 1.3', each having a first conical surface 2.31', and two second bearing rings 2.3', each having a second conical surface 2.31'.

In addition, clamping device 2.6' is arranged in the form of a ring having two conical surfaces 2.61' provided on the inside. Clamping device 2.6' is arranged to be radially resilient, and the ring, for example, has a gap, which allows for a radial deformation of the ring or clamping device 2.6'.

Second body 2.4' is configured so that it has only one first conical surface 2.41', which is concave, i.e., inwardly curved.

With the aid of first clamping sleeve 1.5, first lens 1.2 is secured in position on first bearing ring 1.3 in a centered manner relative to axis A with the aid of a first conical connection I' with contact between conical surface 1.51 of first clamping sleeve 1.5 and conical surface 1.31' of first bearing ring 1.3'. First lens 1.2 is clamped by first clamping sleeve 1.5 via first guide sleeve 1.7.

The two conical surfaces 2.61' of clamping device 2.6' are in physical contact with conical surfaces 2.31' of second bearing rings 2.3' and thereby produce a third conical connection III'. Next, clamping element 2.6' is pressed radially outward against second body 2.4' while bracing against second bearing rings 2.3'. In this manner, third conical connection III' ultimately secures second body 2.4' in position on second bearing rings 2.3' in a centered manner in relation to axis A with the aid of a clamping device 2.6'.

Therefore, a device is produced which is suitable for the transmission of optical signals between two sub-assemblies 1, 2, where first optical waveguide 1.1, first lens 1.2, second optical waveguide 2.1, and second lens 2.2 are coaxially arranged relative to one another in a highly precise manner at a relatively minor assembly outlay. In addition, a bonding process becomes unnecessary when sub-assemblies 1, 2, or the device, are assembled.

What is claimed is:

1. A device for transmitting optical signals between two sub-assemblies, comprising:
    a first sub-assembly including a first lens, a first bearing ring, and a first clamping sleeve having a conical surface; and
    a second sub-assembly including a second lens, a second bearing ring, a second body, a second clamping sleeve having a conical surface, and a clamping device;
    wherein the first bearing ring and the second bearing ring are associated with a bearing by which the first sub-assembly and the second sub-assembly are connected to each other rotatably about an axis;
    wherein the first lens is secured in position on the first bearing ring with the aid of the first clamping sleeve by a first conical connection, centered in relation to the axis;
    wherein the second lens is secured in position on the second body with the aid of the second clamping sleeve by a second conical connection, centered in relation to the axis; and
    wherein the second body is secured in position on the second bearing ring with the aid of the clamping device by a third conical connection, centered in relation to the axis.

2. The device according to claim 1, wherein the second body includes a first conical surface, the second conical connection being provided by the first conical surface of the second body and the conical surface of the second clamping sleeve.

3. The device according to claim 2, wherein the second body includes a second conical surface and the clamping device includes a conical surface, the third conical connection being provided by the second conical surface of the second body and the conical surface of the clamping device.

4. The device according to claim 1, wherein the second body includes a second conical surface and the clamping device includes a conical surface, the third conical connection being provided by the second conical surface of the second body and the conical surface of the clamping device.

5. The device according to claim 4, wherein the second body includes a thread and the clamping element includes a thread adapted to engage with the thread of the second body, the third conical connection provided by a threaded connection between the clamping device and the second body.

6. The device according to claim 1, wherein the first sub-assembly includes a first body having a thread, the first clamping sleeve includes a thread adapted to engage the thread of the first body, and the first conical connection is provided by a threaded connection between the first body and the first clamping sleeve.

7. The device according to claim 1, wherein the second sub-assembly includes a fastening device having a thread, the second clamping sleeve includes a thread adapted to engage with the thread of the fastening device, and the second conical connection is provided by a threaded connection between the fastening device and the second clamping sleeve.

8. The device according to claim 1, wherein the second bearing ring includes a second conical surface and the clamping device includes a conical surface.

9. The device according to claim 1, wherein the clamping device is arranged as a ring having two interior conical surfaces.

10. The device according to claim 1, wherein the bearing includes a rolling bearing.

11. The device according to claim 1, wherein the bearing includes two rolling bearings.

12. The device according to claim 11, wherein the two rolling bearings are preloaded and are arranged as a support bearing in an O-arrangement by the first conical connection and by the third conical connection.

13. The device according to claim 1, wherein the first conical connection is provided under axial tensile loading of the first clamping sleeve and/or the second conical connection is provided under axial tensile loading of the second clamping sleeve.

14. The device according to claim 1, wherein the first sub-assembly includes a first optical waveguide, and the second sub-assembly includes a second optical waveguide.

15. A device for transmitting optical signals between two sub-assemblies, comprising:
    a first sub-assembly including a first lens, a first bearing ring, and a first clamping sleeve having a conical surface; and
    a second sub-assembly including a second lens, a second bearing ring, a second body, a second clamping sleeve having a conical surface, and a clamping device;
    wherein the first bearing ring and the second bearing ring are associated with a bearing by which the first sub-assembly and the second sub-assembly are connected to each other rotatably about an axis;
    wherein the first lens is secured in position on the first bearing ring with the aid of the first clamping sleeve by a first conical connection, centered in relation to the axis;
    wherein the second lens is secured in position on the second body with the aid of the second clamping sleeve by a second conical connection, centered in relation to the axis;
    wherein the second body is secured in position on the second bearing ring with the aid of the clamping device by a third conical connection, centered in relation to the axis;
    wherein the first sub-assembly includes a sleeve arranged radially between the first clamping sleeve and the first bearing ring, the first conical connection being provided by the first clamping sleeve and the sleeve.

16. The device according to claim 15, wherein the second body includes a first conical surface, the second conical connection being provided by the first conical surface of the second body and a conical surface of the second clamping sleeve.

17. The device according to claim 16, wherein the second body includes a second conical surface and the clamping device includes a conical surface, the third conical connection being provided by the second conical surface of the second body and the conical surface of the clamping device.

18. The device according to claim 15, wherein the second body includes a second conical surface and the clamping device includes a conical surface, the third conical connection being provided by the second conical surface of the second body and the conical surface of the clamping device.

19. A device for transmitting optical signals between two sub-assemblies, comprising:
- a first sub-assembly including a first lens, a first bearing ring, and a first clamping sleeve having a conical surface; and
- a second sub-assembly including a second lens, a second bearing ring, a second body, a second clamping sleeve having a conical surface, and a clamping device;
- wherein the first bearing ring and the second bearing ring are associated with a bearing by which the first sub-assembly and the second sub-assembly are connected to each other rotatably about an axis;
- wherein the first lens is secured in position on the first bearing ring with the aid of the first clamping sleeve by a first conical connection, centered in relation to the axis;
- wherein the second lens is secured in position on the second body with the aid of the second clamping sleeve by a second conical connection, centered in relation to the axis;
- wherein the second body is secured in position on the second bearing ring with the aid of the clamping device by a third conical connection, centered in relation to the axis;
- wherein the first bearing ring includes a conical surface, the first conical connection being provided by the first clamping sleeve and the conical surface of the first bearing ring.

* * * * *